J. CARLIER.
DEVICE FOR MEASURING ACCELERATIONS.
APPLICATION FILED SEPT. 5, 1916.
1,317,072.
Patented Sept. 23, 1919.
3 SHEETS—SHEET 1.
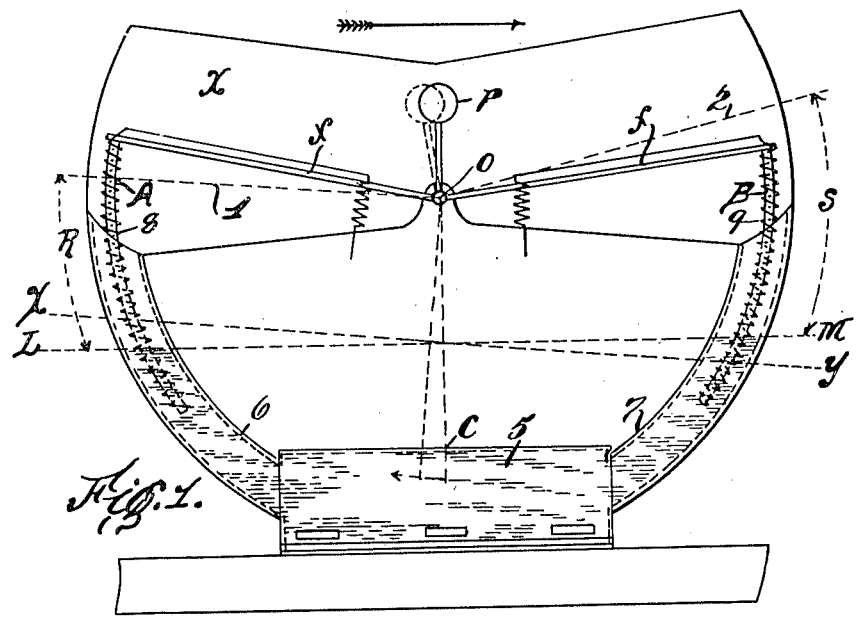
Inventor
Joseph Carlier
By his Attorneys
Newell & Neal

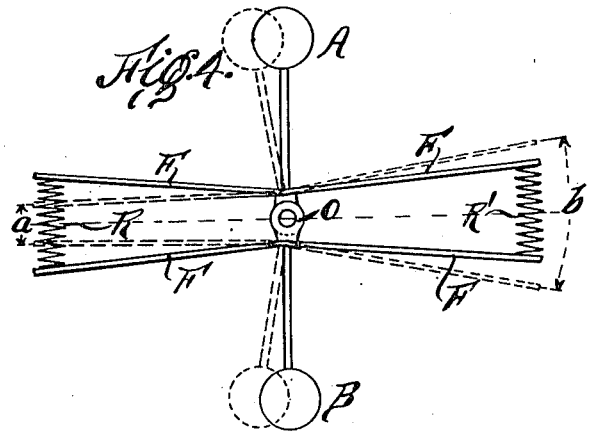
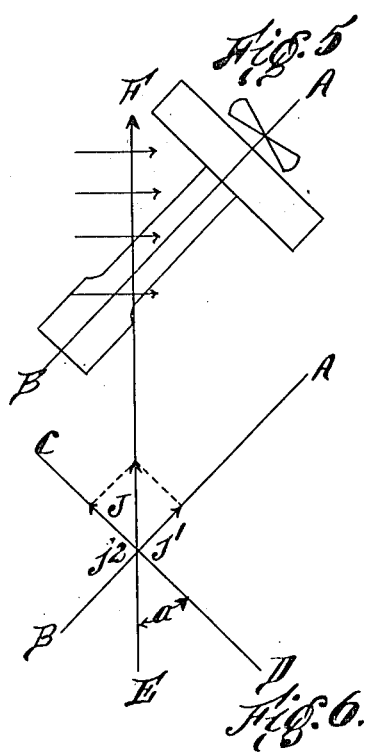
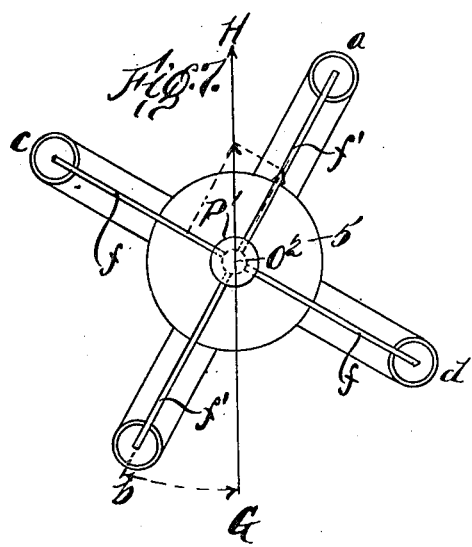
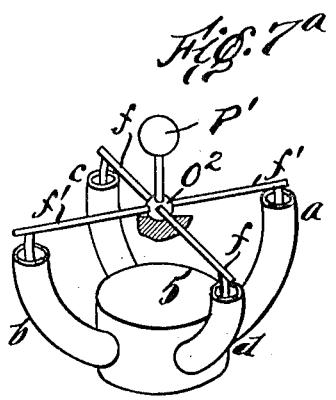

J. CARLIER.
DEVICE FOR MEASURING ACCELERATIONS.
APPLICATION FILED SEPT. 5, 1916.

1,317,072.

Patented Sept. 23, 1919.
3 SHEETS—SHEET 3.

Inventor
Joseph Carlier
By his Attorneys
Newell & Neal

UNITED STATES PATENT OFFICE.

JOSEPH CARLIER, OF LESSINES, BELGIUM.

DEVICE FOR MEASURING ACCELERATIONS.

1,317,072.　　　　　Specification of Letters Patent.　　Patented Sept. 23, 1919.

Application filed September 5, 1916.　Serial No. 118,566.

*To all whom it may concern:*

Be it known that I, JOSEPH CARLIER, subject of the King of Belgium, residing at 58 Rue des 4 Fils Aymon, Lessines, Belgium, have invented certain new and useful Improvements in Devices for Measuring Accelerations, of which the following is a clear, full, and exact description.

The object of this invention is to provide a construction which will measure and suitably translate the accelerations or retardations of a moving body.

Any change of a body from its condition of rest or rate of speed is caused by some force. As a result, the action of a force on a body carried by a vehicle and suspended like a weight will be manifested by a change from its equilibrium position. An ordinary pendulum is under the influence both of gravity and the acceleration, or retardation (negative acceleration), of the vehicle which carries it. The result is that the eqilibrium of such a pendulum is the consequence of the different kinds of forces acting on it, such as the component of gravity and the accelerations or retardations, etc.

In order to translate or indicate only the acceleration or retardation of the body, it has been necessary heretofore to find the vertical line in space and then to project this line to the equilibrium position taken by the pendulum.

Means to determine a vertical exist for example in the gyroscope, one of its qualities being to remain in the position taken at the time it is started, but the gyroscope has certain defects. For example, a gyroscope started in motion, and with its axis pointing toward the center of the earth, on a boat leaving New York would theoretically always keep its axis parallel to such line, and when the boat reached Liverpool it would not point toward the center of the earth or vertical at Liverpool.

My astatic pendulum obviates this defect. As an example of this invention I have provided in a combined mechanism a system of pendulums whose centers of gravity or the resultant center of gravity of one system is under its center of rotation, yieldingly connected with another pendulum system whose center of gravity is above its center of rotation. In such a construction the components of gravity acting on the two systems, one above the other, are in opposition and equilibrate one another, while the forces of acceleration (or retardation) concur.

One embodiment of my invention is a liquid pendulum for instance, and a float whose mass is above the liquid pendulum, or a solid pendulum between which are springs or other elements without an appreciable mass, in order to equilibrate, such as does a float, the gravity components of the pendulums.

In the accompanying drawings which show various forms of my invention,

Figure 1 is a side view of one form of an astatic pendulum;

Fig. 2 is a diagrammatic view of the electrical connections;

Figure 8:
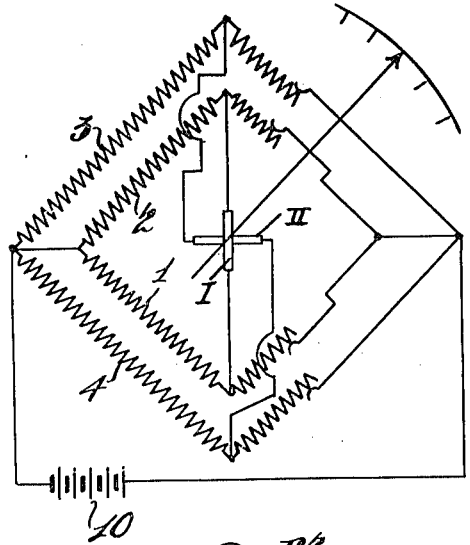
Figure 10:
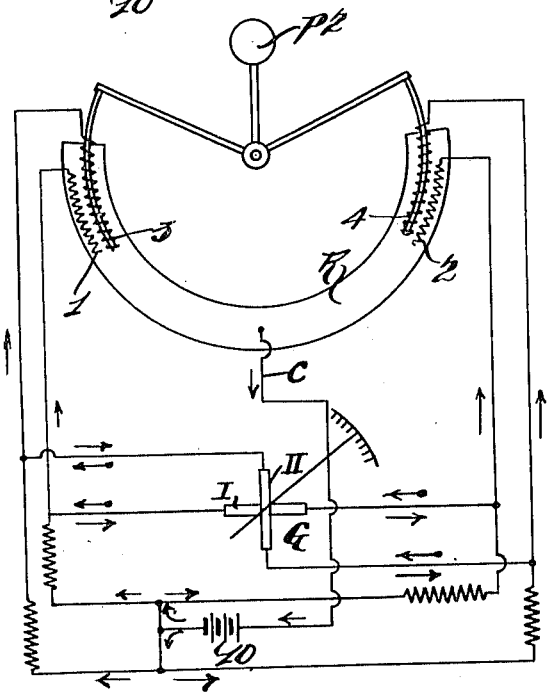
Figure 9:
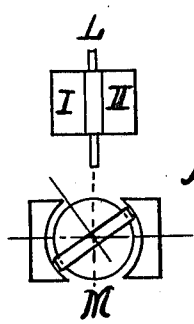

Fig. 2$^A$ is an ordinary Wheatstone bridge;

Fig. 3 is a diagrammatic view of a modification; and

Figs. 4 to 10 are further modifications.

Referring to Fig. 1, I have provided a carrier X which may be mounted on any vehicle whose acceleration (positive or negative) is desired to be determined. On this carrier are mounted two masses which are movable in the same direction due to their inertia when said carrier is accelerated, such as from its position of rest or by increasing or diminishing its speed of movement. These masses are, as illustrated, a body of mercury contained in the chamber 5 provided with two legs 6 and 7. The mercury normally stands at the level indicated by the dotted line L, M. This mercury in its curved tubes therefore acts as a pendulum. The other mass is represented by a solid body P mounted on a rod fixed to a shaft $o$ and in unstable equilibrium. When the carrier is moved to the right, for example from a position of rest, the mass of mercury will move to the left and the mass P will also move to the left, as indicated by the dotted lines. The force of acceleration F=M$j$ in which formula $j$ is the value of the acceleration and M the mass.

Fixed to the shaft $o$ are two arms $f, f,$ which carry curved rods A and B which dip into the mercury, forming a yielding connection between the mass of mercury and the mass P, and which in this instance normally float the connecting mechanism so that the mass P or solid pendulum is yieldingly resisted and normally held floated in equilibrium with its center of gravity directly above the axis of rotation o.

If the device is accelerated to the right for example, the mercury pendulum mass will, for example, take the position of the line X, Y, thus dipping the rod A more deeply into the mercury on that side, and the mercury would to an equal extent, leave the rod B. The pendulum P, however, will also move or tend to move to its dotted line position, and the arms f, f, will be moved to dotted line 1, 2. Obviously the movement of the mercury resists this movement of the pendulum P and tends to restore it to its original position. Gravity acts on the mercury mass to restore it to its original position. Gravity, however, acts on the pendulum P when moved to its dotted position, tending to move it farther out of equilibrium, and the two components of gravity oppose each other.

The rate of acceleration ($j$) may be measured by the lengths of the arcs R, S, or rather by the difference between the two (S—R).

The position of the tank, that is to say, the change in its position about the center $o$ has no influence on the correctness of the apparatus because the frame $f$ of the solid pendulum is floating on the liquid pendulum and follows all its positions of rotation unless a force of acceleration (or retardation) is acting on it.

The above apparatus may be combined with a suitable translating device to indicate numerically, mechanically or otherwise the accelerations (positive or negative) of the common carrier of the two pendulums, and this may be applied in various ways.

As an instance of such a translating device, I place on the rods A and B two resistance coils 8 and 9 and connect them, for example, in the two legs of a Wheatstone bridge.

Refer to Fig. 2$^A$. 10 is a battery or other source of electro-motive force having the parallel circuits I, III, and II, IV. V is a galvanometer connected at the points $a$, $b$, and thus constituting one form of a translating device which in this instance visually or numerically indicates variations in the current flowing in the two branches of the circuit. Now if the resistances 8 and 9 are connected in the branches I and II respectively, any acceleration given to the apparatus will vary the resistances of the branches I and II. This is because when the rod A with its resistance coil is thrust down into the mercury, the mercury will short circuit some of the coils and so that branch will have a less resistance than before, and, conversely, the other branch will have a greater resistance because more of the resistance 9 has been moved out of the mercury and therefore more resistance inserted in the circuit. In the example illustrated, if we assume that the resistance 9 is in the branch II of Fig. 2$^A$, and resistance 8 in the branch I of Fig. 2$^A$, more current will flow from $c$ to $a$ than from $c$ to $b$, and consequently will affect the galvanometer in one direction. The galvanometer will therefore measure the acceleration given to the apparatus, as the galvanometer in effect indicates the difference between the arcs S and R. The result of the influence of gravity on the mercury, opposing the rise of the mercury in the leg S, is therefore opposed to the result of the influence of gravity exerted on the pendulum P, and the apparatus will measure the true acceleration force alone, or, in other words, the acceleration force given to the mercury minus the decrease due to gravity, plus an equal increase due to gravity acting on the pendulum P.

This principle is applicable to translating devices of various kinds. In Fig. 2 I have shown the branches I and II of the Wheatstone bridge (in which are the resistances 8 and 9) wound oppositely into a coil. This combined coil is provided with an armature coil V supposed to be placed inside of the beforementioned coils, or so near thereto as to be influenced and moved by the current or combined currents passing through the said coils. It obviously may be a simple bar armature if desired. This armature V is mounted on, or suitably attached to (by means not shown), an axle $o'$ so that the movement of the armature in one direction or the other will rock the axle. In this figure, III and IV are adjustable resistances. According to the direction of motion and the acceleration (or retardation) the current in one of the coils will be greater than that in the other. These currents determine a flux of forces N and N', N being equal to N' when the acceleration is zero. The resulting flux is N—N', or N'—N, giving attraction to the armature V or repulsion, as the case may be. Attached to the axle $o'$ is a rod 11 connected to a slide valve 12 of a piston chamber 13, in which moves a piston 14 which may actuate a valve, brake or any other device (not shown). Such a construction obviously indicates one form of a mechanical translating device operated by the relative movement of the pendulums.

In Fig. 3 I have shown another application of my invention, which totalizes the accelerations or retardations of the pendulums. The armature V of the meter is traversed by the current in the diagonal of the Wheatstone bridge, and the branches III and IV are affected by the variations of the resistances 8 and 9. The intensity and direction of rotation of the armature will of course change according to the values of the resistances of the branches of the circuit.

Another example of the invention is shown in Fig. 4, in which I have used two solid pendulums A and B each movable around the axis O and each carrying arms like arms F, F of Fig. 1. Between them are springs R, R' of small mass which equilibrate them as to their gravity. When an acceleration $j$ is acting on the suspended masses, the two pendulums take the angles shown by dotted lines, the difference of the arcs $a$ and $b$ recording the acceleration or retardation. Any suitable translating device (not shown) may be utilized, as for example on the same principle as in the other figures heretofore described. It will be understood, of course, that the relative masses or relative pendulum lengths of the two pendulums are so proportioned that the lower pendulum will tend to maintain the system in equilibrium as in the other forms of the invention herein described and illustrated.

In bodies moving in space, for example such as an aeroplane, it may be desirable to measure the acceleration occurring in each of two different planes. For example in an aeroplane, forces of different directions may act simultaneously, one or more of them being essentially variable like the wind. We may therefore record the accelerations or resultant of the accelerations of the different forces acting on such a body. This should be done for the two or more planes in which occur the different accelerations desired to be indicated, for example in Figs. 5 and 6 the record of the resultant accelerations $j$ as to the axis A, B, and the resultant accelerations $j^2$ as to the axis C, D. In Figs. 7 and 7ª I have shown respectively a plan and diagrammatically perspective view of such a device. It is substantially the mercury apparatus of Fig. 1, with two additional legs in a transverse plane. In other words, the mercury reservoir 5 has four legs, $a, b, c, d$. The solid pendulum P' is mounted on a universal joint at $o^2$ and has four arms, $f, f, f', f'$, dipping into the mercury in the legs. Each arm is provided with a resistance such as the resistance 9 or 10 of Fig. 1. Of course the float and pendulum P will incline away from whatever direction the resultant of acceleration may occur and the apparatus will measure or indicate the resultant acceleration if the resistances are inserted in a double Wheatstone bridge such as indicated at Fig. 8. In this figure, for example, the two moving coils I and II are fixed on the same axle, and the needle of the galvanometer will indicate the difference between the currents, thus the difference between $j'$ and $j^2$ (Fig. 6) or the angle 90°—alpha.

If the two coils of the galvanometer are astride a common axle L, M (Fig. 9) like in the logometer Carpentier, the position of the needle will express the tangents of the angle alpha (Fig. 6) and, consequently, the angle itself of the axis C, D of the aeroplane regarding the trajectory followed. This principle may be applied in various ways.

My invention may be applied, for instance, as a verticalometer, showing on a scale the number of degrees of incline. This may be done in various ways. Supposing the measurement is being done in a single plane and with the liquid-solid system. The resistances 1 and 2 (Fig. 10) are fixed in the reservoir R and measure the incline of the mercury therein under any force, such as gravity and acceleration together, but the coil I of the galvanometer G (influenced in one direction by gravity and acceleration combined) is also under the control of another coil II, which is inserted in a circuit in which are the resistances 3 and 4 belonging to the floated pendulum P². Thus the coil 2 controls acceleration alone. As the direction of the currents through the coils I and II are in opposition, the effect on the scale is subtraction, and the difference between gravity plus acceleration and acceleration alone, is recorded. An incline in space could be recorded in a similar fashion.

I am aware that various modifications of my invention may be made without departing from my invention. I have shown the above instances of its application merely as illustrations and not with the intention of limiting the scope of my claims.

What I claim as new is:—

1. In an apparatus of the character described, two masses having a common carrier and movable in the same direction due to their inertia when said carrier is moved, one being normally in stable equilibrium due to gravity, and the other in unstable equilibrium, means connecting the two masses whereby the movement of one resists the movement of the other, and a suitable translating device operated by the relative movement of said masses.

2. In an apparatus of the character described, two pendulums having a common carrier and movable in the same direction due to their inertia when said carrier is moved, one being normally in stable equilibrium due to gravity, and the other in unstable equilibrium, means connecting the two pendulums whereby the movement of one resists the movement of the other, and a suitable translating device operated by the relative movement of said pendulums.

3. In an apparatus of the character described, two masses having a common carrier and movable in the same direction due to their inertia when said carrier is moved, a support for one mass whereby gravity tends to return it to its normal position, a support for the other whereby gravity tends to move it out of its original position, means connecting the two masses whereby the movement of one mass resists the movement of the other mass, and a translating device operated by the relative movement of said masses.

4. In an apparatus of the character described, two pendulum systems mounted on a common carrier so as to be independently movable with respect thereto due to an acceleration of said carrier, the center of gravity of one system being below its center of rotation and the other above its center of rotation, and means yieldingly linking the two systems in counter-balancing relation whereby the components of gravity of the two systems are equilibrated.

5. In an apparatus of the character described, two pendulum systems mounted on a common carrier so as to be independently movable with respect thereto due to an acceleration of said carrier, the center of gravity of one system being below its center of rotation and the other above its center of rotation, means yieldingly linking the two systems in counter-balancing relation whereby the components of gravity of the two systems are equilibrated, and a translating device operated by the relative movement of said systems.

6. In an apparatus of the character described, a carrier, a pendulum thereon, a translating device operated by the movement of said pendulum when said carrier is accelerated, a mass operated both by inertia and gravity, and connections between it and said translating device and operated by the relative movements of said pendulum and mass, whereby the effect of gravity on said pendulum is substantially neutralized in said translating device.

7. In a device of the class described, two pendulums, one of which has its center of gravity at a greater distance from its center of oscillation than the other, a common support for the centers of oscillation of said pendulums, a yielding connection between said pendulums, and means for measuring the total angular movement of said pendulums about their centers of oscillation under the action of inertia when the common support is moved.

8. In a device of the class described, two pendulums having a common center of oscillation about which each may oscillate independently, and having their centers of gravity respectively above and below said common center, and connections between said pendulums whereby they are yieldingly maintained in relative equilibrium.

9. In a device of the class described, two pendulums, one having its center of gravity above its center of oscillation and the other having its center of gravity below its center of oscillation, whereby upon a simultaneous translation of the centers of oscillation said centers of gravity tend to approach a horizontal plane between them, a yielding connection between said pendulums, and means for measuring the amount of approach of said pendulums.

10. In an apparatus of the character described, two masses having a common carrier and movable in the same direction due to their inertia when said carrier is moved, means connecting the two masses so arranged that the movement of one yieldingly resists the movement of the other and tends to restore both masses to their original relative position, and a suitable translating device operated by the relative movement of said masses.

11. In an apparatus of the character described, a common carrier, a liquid pendulum and a mass in unstable equilibrium mounted thereon, connections arranged to yield between said pendulum and said mass whereby movement of said liquid pendulum tends to move said mass and hold the two in the same relative position, a translating device and means for operating the same controlled by the relative movement of said liquid pendulum and mass.

12. In an apparatus of the character described, two masses having a common carrier and movable in the same direction due to their inertia when said carrier is moved, one of said masses comprising a pendulum of fluid, electrically-conducting material, means connecting one mass with the liquid pendulum and dipping therein so that said liquid pendulum supports and yieldingly resists the movement of the other mass and is adapted to restore both masses to their original relative position, a suitable translating device and electrical connections controlled by the relative movement of said connecting means and said liquid pendulum.

Signed at New York, N. Y., this 25th day of August 1916.

JOSEPH CARLIER.

Witnesses:
EMERSON R. NEWELL,
BEATRICE MIRVIS.